US006250399B1

(12) United States Patent
Giardino

(10) Patent No.: US 6,250,399 B1
(45) Date of Patent: Jun. 26, 2001

(54) PNEUMATIC TOOL WITH A REVERSE VALVE HAVING AN OVERDRIVE

(75) Inventor: David A. Giardino, Rock Hill, SC (US)

(73) Assignee: Chicago Pneumatic Tool Company, Rock Hill, SC (US)

( * ) Notice: Subject to any disclaimer, the term of this patent is extended or adjusted under 35 U.S.C. 154(b) by 0 days.

(21) Appl. No.: 09/394,326

(22) Filed: Sep. 13, 1999

(51) Int. Cl.[7] .............................. F01C 21/00; B23B 45/04

(52) U.S. Cl. ............................ 173/47; 173/218; 173/221; 173/93.5

(58) Field of Search .............................. 173/47, 93, 93.5, 173/176–78, 218, 221, 168–70; 418/266, 268

(56) References Cited

U.S. PATENT DOCUMENTS 2,414,638 * 1/1947 Dobie .................................. 418/1
3,093,360 * 6/1963 Krouse ............................ 173/218
3,472,323 * 10/1969 Hall ................................ 173/221
3,752,241 * 8/1973 Bent ................................ 173/221
3,951,217 * 4/1976 Wallace et al. .................. 173/218
4,016,940 * 4/1977 Spring, Sr. ...................... 173/169
4,708,210 * 11/1987 Rahm .............................. 173/169
4,962,787 * 10/1990 Mayhew .......................... 173/170
5,918,686 * 7/1999 Izumisawa ........................ 173/47
6,047,780 * 4/2000 Lin .................................. 173/221
6,082,986 * 7/2000 Seward et al. .................. 418/268

* cited by examiner

*Primary Examiner*—Scott A. Smith
(74) *Attorney, Agent, or Firm*—Schmeiser, Olsen & Watts

(57) ABSTRACT

The invention is a pneumatic tool with a reverse valve having an overdrive. In particular, the pneumatic tool includes a housing, a rotor, rotatably mounted within the housing, an output shaft operatively coupled to the rotor, and pressure chambers defined between the housing and the rotor. A pneumatic reverse valve having an overdrive is operatively coupled to the rotor. The overdrive provides increased torque and increased speed to the output shaft. The reverse valve controls flow of pressurized air to a multi-chambered motor of the tool such that the direction of the motor can be reversed and the number of pressure chambers receiving pressurized air can be selected regardless of direction.

19 Claims, 6 Drawing Sheets

PNEUMATIC TOOL WITH A REVERSE VALVE HAVING AN OVERDRIVE

BACKGROUND OF THE INVENTION

1. Technical Field

The invention relates generally to pneumatic tools. More specifically, this invention relates to a pneumatic tool with a reverse valve having an overdrive for variable torque and speed.

2. Related Art

Heretofore, various types of reverse valves have been used in pneumatic tools, e.g., impact wrenches and pulse tools. For example, U.S. Pat. No. 5,083,619 to Giardino et al., and assigned to *Chicago Pneumatic Tool Company*, discloses a plunger type reverse valve for reversing the direction of a rotor in an impact wrench. U.S. Pat. No. 3,714,994 to Zoerner et al., and assigned to *Gardner-Denver Company*, discloses rotary reverse valves. Furthermore, the related art includes overdrive reverse mechanisms for hydraulic motors, see, e.g., U.S. Pat. No. 3,586,466 issued to Erickson. All the patents referred to herein are hereby incorporated by reference.

One of the disadvantages of pneumatic tools is the ability to obtain variable torque and variable speed in the same tool in both forward and reverse directions. This is important in applications such as large structure construction, demolition or repair, e.g., bridges. For example, one problem in these applications which has long existed and has not been adequately addressed is providing enhanced torque and speed for removal of a lug nut subject to corrosion, dirt, or paint. Typically, a worker has two impact wrenches available, a small light weight impact wrench and a large heavy impact wrench. The small impact wrench is used for the majority of the lug nuts so a worker does not get tired and for ease of manipulation. The large impact wrench is for removal of difficult lug nuts. Such a large impact wrench is heavy and cumbersome to carry when only needed for hard to remove lug nuts. Furthermore, carrying two impact wrenches to be available for the occasional hard to remove lug nut, is time consuming and inefficient.

Heretofore, variable torque and speed hydraulic motors have been disclosed. However, hydraulics when used on hand-held tools has several disadvantages. For example, hydraulics retains heat generated by friction, etc. Another disadvantage is that hydraulic fluid must be contained in a sealed system. If the hydraulic system does not have adequate seals, hydraulic fluid will be lost from the system resulting in slick fluid leaking on the tool.

Another disadvantage in a hydraulic system, such as disclosed in U.S. Pat. No. 3,586,466, is that as torque is increased, speed decreases. This is because pressurizing a single chamber between the rotor and housing with a non-compressible fluid causes the rotor to rotate at a first speed and torque. However, by pressurizing two chambers, the rotor rotates at an increased torque and decreased speed since hydraulic fluid is not compressible, and does not expand to fill an area. In contrast, when air is subject to an increased area, it quickly expands to fill that area. Accordingly, pressurizing two chambers with air results in an increased torque and increased speed. A useful analogy is a balloon filled with air exploding when poked with a pin. This is because air in the balloon is compressed and moves quickly to neutralize the surrounding air pressure. In contrast, a balloon filled with water when poked does not explode, but slowly leaks. This is because the water is not compressed.

While the related art provides for pneumatic tools having reverse valves, and hydraulic motors having variable speed and torque, none provide a pneumatic tool having a reverse valve with variable speed and torque, i.e., overdrive. Such a device is needed to solve the long-felt problems in the power tool industry which have not been heretofore adequately addressed.

SUMMARY OF THE INVENTION

It is an advantage of this invention to overcome the above noted deficiencies. In order to do so, this invention provides a pneumatic tool including a housing; a rotor, rotatably mounted within the housing; an output shaft, operatively coupled to the rotor; pressure chambers, defined between the housing and the rotor; and a pneumatic reverse valve, operatively coupled to control the rotor, the pneumatic reverse valve having an overdrive providing increased torque and increased speed to the output shaft. Furthermore, the present invention provides for a reverse valve for a pneumatic tool having a housing; a rotor, rotatably mounted within the housing; and pressure chambers, defined between the housing and the rotor, the pneumatic reverse valve includes an overdrive for increased torque and increased speed.

One of the advantages of a pneumatic tool of this invention is the ability to obtain increased torque and increased speed in the same tool. This addresses the problems in applications such as large structure construction, demolition or repair, e.g., bridges.

A further advantage of this invention is that it does not have the problems of hydraulics. Pneumatic tools do not heat up like hydraulic motors, but are self cooling because as the air flows through the tool it expands and cools. Furthermore, pneumatic tools do not require a closed system like hydraulics having inherent sealing problems. Air enters a pneumatic tool through an inlet and exits into the atmosphere through an exhaust port. A pneumatic tool does not leak. Thus, a pneumatic tool does not require the complicated sealing structure of a hydraulic motor.

Another advantage of a pneumatic tool is that as torque is increased, speed is increased as well.

Another advantage of this invention is that the reverse valve allows control of motor direction and overdrive in both the forward and reverse directions.

A feature of the invention is that the reverse valve can be provided in a variety of forms. For instance, the reverse valve can be a plunger valve or, more preferably, a rotary reverse valve. Optionally, a plunger/rotary reverse valve combination may be used.

A rotary reverse valve of the present invention may include a rotatable planar element that includes at least three apertures therethrough. The openings of the rotatable planar element may direct flow of air through a variety of layout configurations which allow selective delivery of pressurized air to one or more ports. For example, the openings can be laid out in a T-shape, a y-shape, or a Y-shape with an extra opening between the upper openings (e.g., ø or peace sign shaped).

It is a further feature of a rotary reverse valve of the present invention that when the reverse valve takes the form of a rotatable planar element, the valve includes a rotatably positionable handle extending externally of the housing of the motor for positioning by the operator.

A pneumatic tool according to this invention includes pressure chambers defined between the housing and the rotor to provide an overdrive feature. Each of these chambers contains a first, forward-driving port for receiving pressurized air to drive the motor in a forward direction and a second, reverse-driving port to receive pressurized air to drive the motor in a reverse direction. As will be described herein, a further advantage of the present invention can be extended to a pneumatic tool with any number of pressure chambers surrounding the rotor.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DESCRIPTION OF THE PREFERRED EMBODIMENTS

The present invention is disclosed for use with pneumatic tools, such as an impact wrench, nut runner, or pulse tool. It should be noted, however, that a reverse and overdrive selection valve in accordance with the present invention can be used on a variety of pneumatic tools having various reverse valve configurations such as a plunger valve having an axis parallel to the output shaft (shown in U.S. Pat. No. 5,083,619), plunger valves having an axis perpendicular to the output shaft (not shown) and combination plunger/rotary reverse valves (not shown). Furthermore, the present invention is disclosed, illustratively, for use with a rotary reverse valve. However, it should be noted that the present invention may find applicability in any reverse valve on a pneumatic tool.

Figure 1:
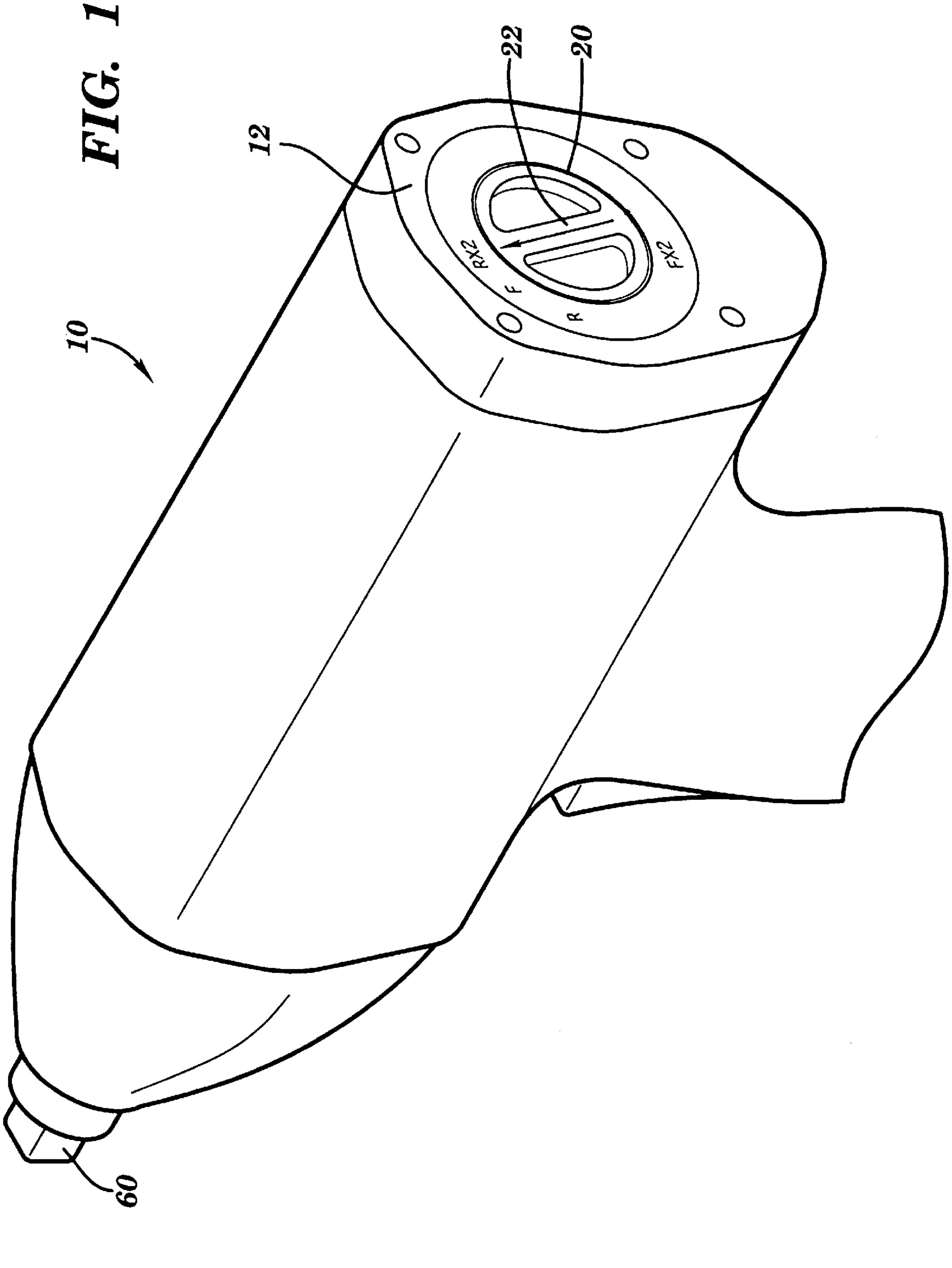
FIG. 1 shows an isometric view of pneumatic hand tool including a rotary reverse and overdrive selection valve in accordance with an embodiment of the present invention.

FIG. 1 shows an isometric view of a pneumatically driven hand tool including a first embodiment of a rotary reverse and overdrive selection valve 20 in accordance with the present invention. The valve 20 is shown positioned in a valve housing 12 attached to the rear of a pneumatic tool 10 including an output shaft 60.

In order to select a drive option with the valve 20 shown in FIG. 1, the operator turns the valve handle 22 to a selected position. In the particular embodiment shown, the operator may choose between a forward position, a reverse position, a forward overdrive position and a reverse overdrive position. The drive option positions are illustrated to the operator by an arrow provided on the valve handle 22 which points to markings on the valve housing 12. For this particular embodiment of valve, "F" and "R" indicate forward and reverse, respectively, and "FX2" and "RX2" indicate forward and reverse overdrive, respectively.

Figure 2:
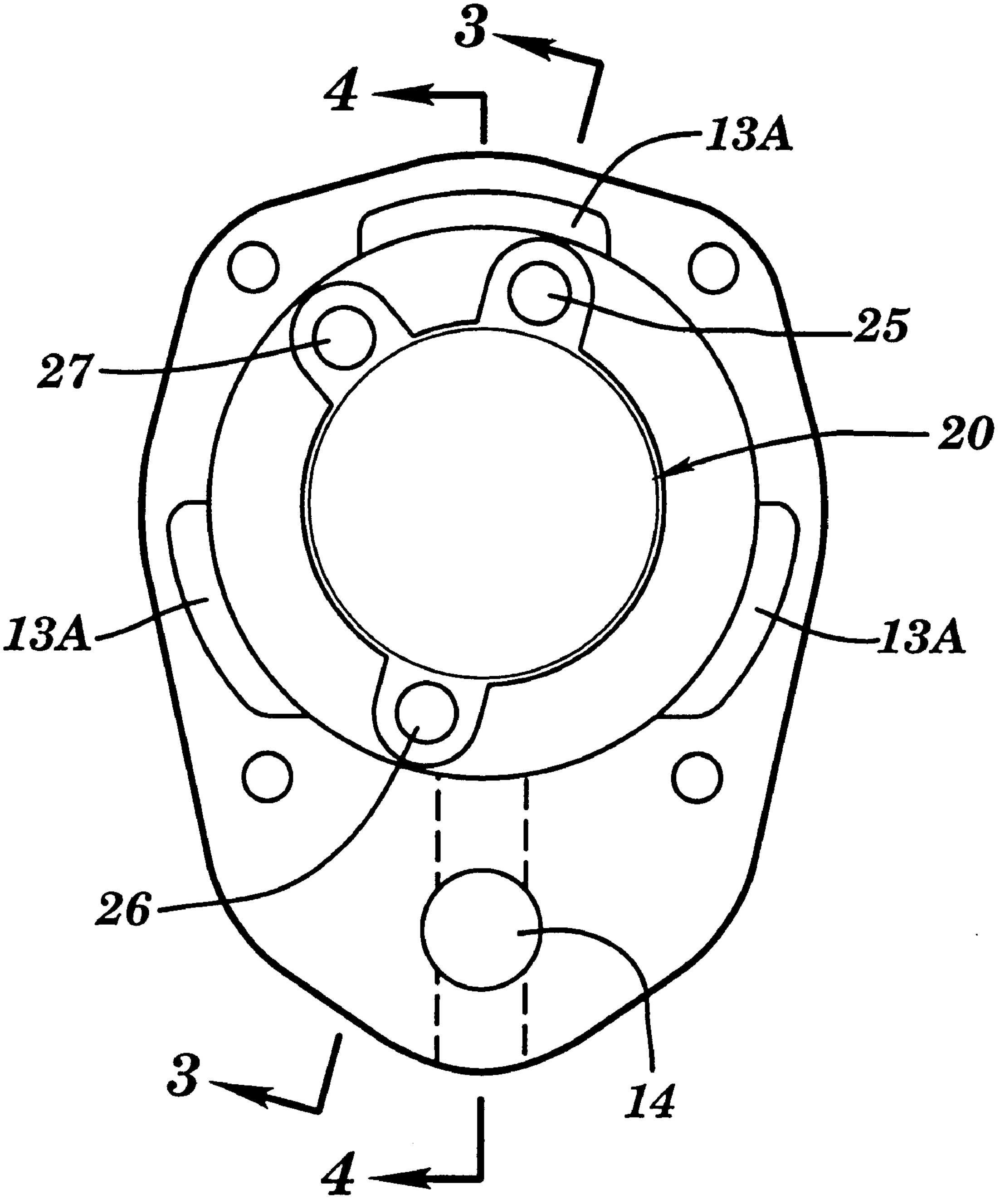
FIG. 2 shows a rear view of the interior of a valve housing including the valve in accordance with the first embodiment of the present invention.
Figure 4:
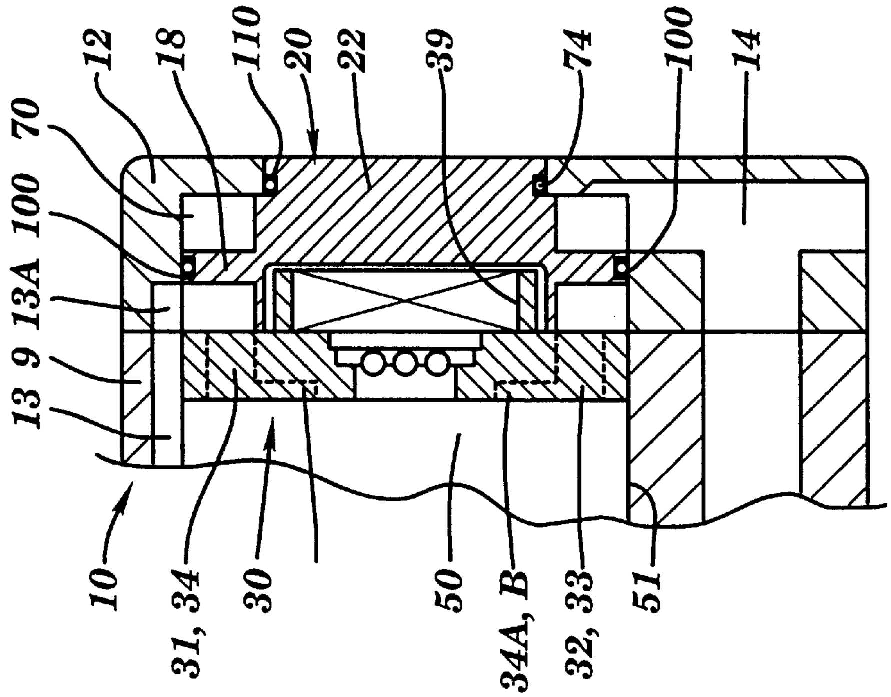
FIG. 4 shows a cross-sectional view of the valve housing along line 4—4 of FIG. 2 in accordance with the present invention.
Figure 3:
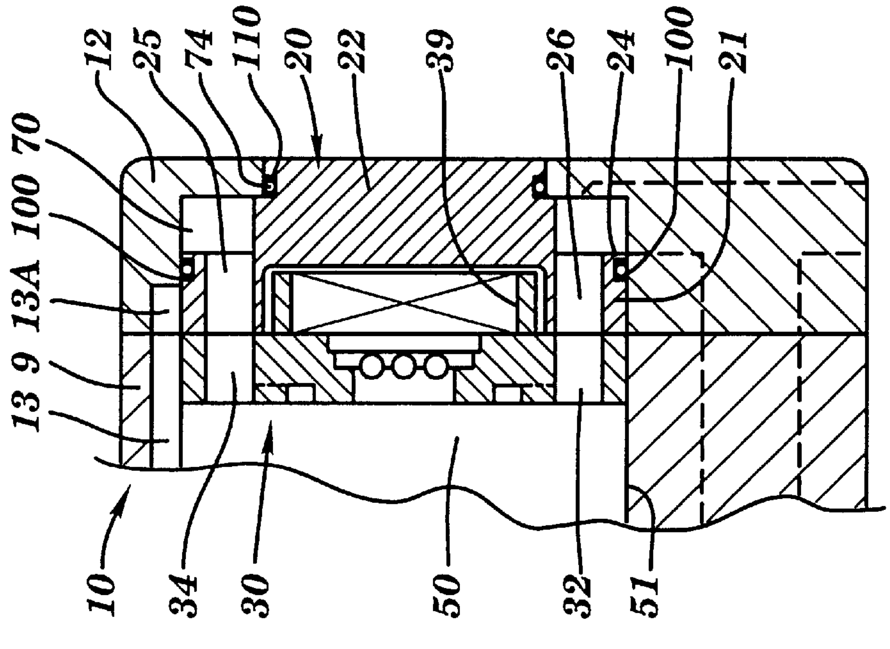
FIG. 3 shows a cross-sectional view of the valve housing along line 3—3 of FIG. 2 in accordance with the present invention.

So that operation of the reverse and overdrive selection valve can be better understood, the internal operation of the pneumatic motor will now be described. In FIG. 2, a rear view of the interior of the valve housing 12 including the reverse and overdrive selection valve 20 in accordance with a first embodiment of the present invention is shown. FIGS. 3 and 4, show cross sectional views of the air driven tool including the valve housing 12, taken from the perspective of lines 3—3 and 4—4 of FIG. 2, respectively.

Referring to FIGS. 3 and 4, the pneumatic tool 10 has a motor housing 9 and valve housing 12. The motor housing 9 includes a rotor chamber 51 for rotatably supporting a rotor 50. The rotor 50 is in turn operatively coupled to the output shaft 60 of the tool. At the rear of the motor housing 9, an inner housing 30 is connected so as to limit the openings into the motor housing 9. The valve housing 12 is sealingly attached by bolts (not shown) to the rear of the motor housing 9 to provide pressurized air via opening 14, shown in FIG. 4.

Figure 10:
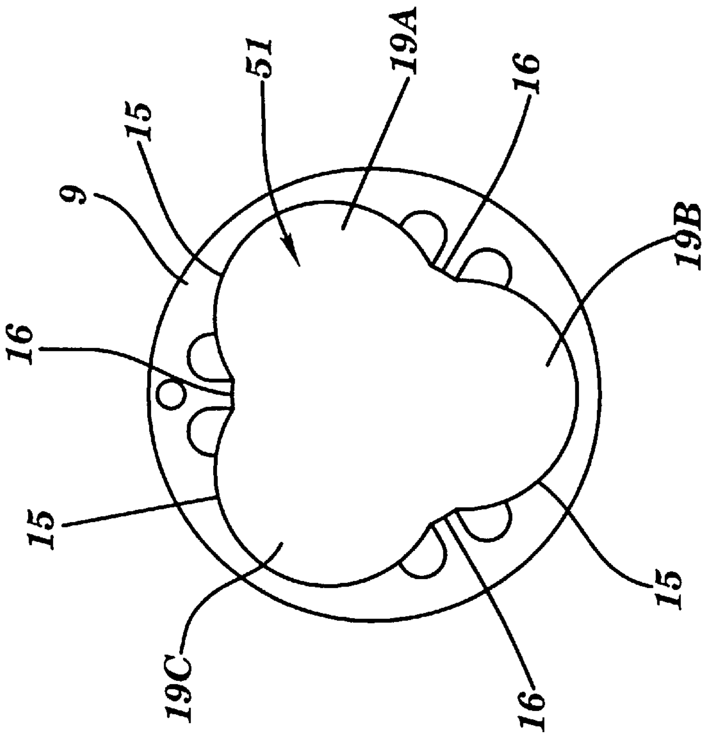
FIG. 10 shows a rear view of a motor chamber in accordance with an alternative embodiment of the present invention.
Figure 9:
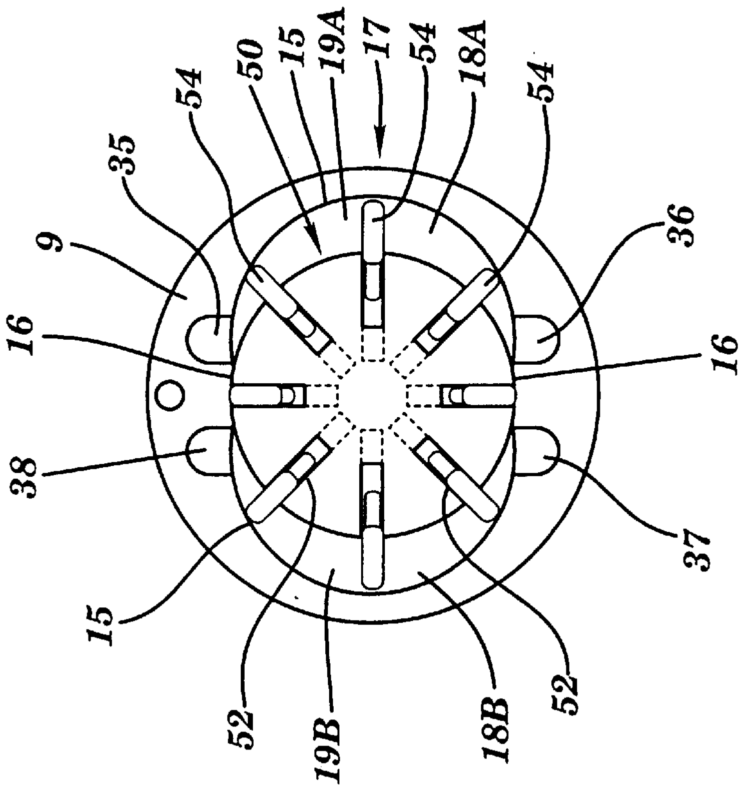
FIG. 9 shows a rear view of a motor chamber in accordance with an embodiment of the present invention.

As exemplified by comparing FIGS. 9 and 10, the number of pressure chambers 19 provided to drive the rotor 50 may be changed to accommodate different sized rotors, higher or lower speeds, higher or lower torque, etc. For simplicity, however, the present invention will be primarily described hereafter in terms of a two chambered housing. To form the chambers 19, as shown in FIG. 9, the interior periphery of the motor housing 9 is provided with alternating circumferentially spaced concavities 15 and cylindrical surface portions 16. When the rotor 50 is placed within the motor housing 9, pressure chambers 19A, 19B are defined between the rotor 50 and concavities 15. Otherwise, the rotor 50 is seated in the cylindrical surface portions 16 for rotation.

The rotor 50 is driven by pressurized air entering through one or more of ports 35–38 formed in the motor housing 9. The pressurized air entering through ports 35–38 rotates the rotor by moving a plurality of vanes 54 seated in radially extending slots 52 in the rotor 50. It should be understood that although eight vanes 54 are shown, more or fewer vanes may be used. The vanes are biased outwardly by pressurized air delivered to the innermost part of the slots 52 and by centrifugal force. The outer ends of vanes 54 are held in contact with the inner periphery of the motor housing 9 regardless of whether the vanes 54 are within the cylindrical portions 16 or pressure chambers 19A–B. To allow escape of the pressurized air to the atmosphere, a plurality of exhaust ports 13 are provided surrounding the rotor chamber 51. The exhaust ports extend into the valve housing 12 as shown at 13A.

Figure 13:
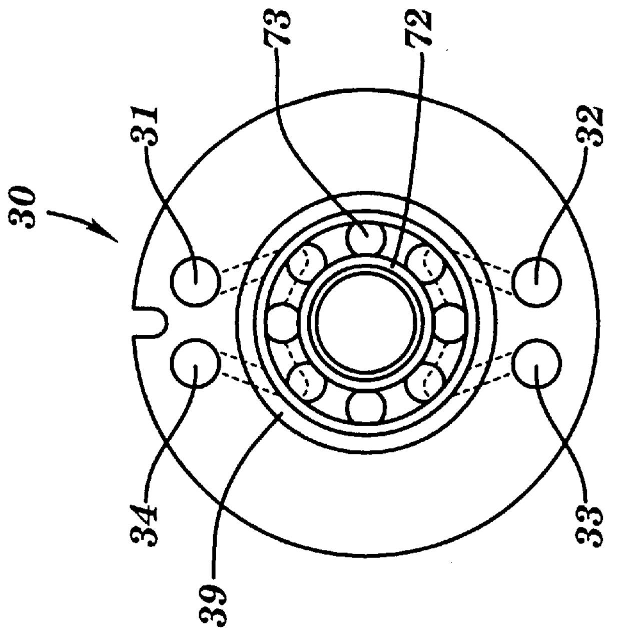
FIG. 13 shows a rear view of the inner housing of the motor in accordance with the present invention.
Figure 12:
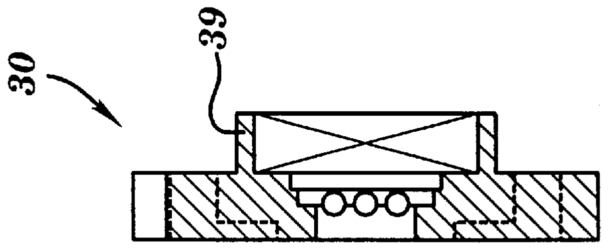
FIG. 12 shows a side view of the inner housing of the motor in accordance with the present invention.
Figure 11:
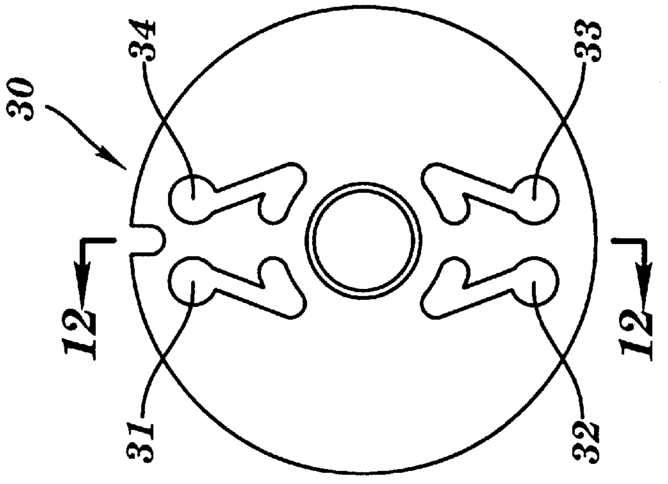
FIG. 11 shows a front view of an inner housing of the motor in accordance with the present invention.

Returning to the motor, each pressure chamber 19A, 19B includes two ports: a first port 35, 37 and a second port 36,

38. The first and second ports of each chamber are located at opposite ends of the chamber. To direct pressurized air to the ports 35–38, an inner housing 30, as detailed in FIGS. 11–13, is provided at the rear of the rotor chamber 51. The inner housing 30 includes a plurality of openings 31–34 which allow pressurized air to pass from the valve housing 12 into ports 35–38.

Inner housing 30 also is provided with a bearing 72, having balls 73, to support the axle of the rotor 50 (not shown). Furthermore, inner housing 30 is provided with a circular lip 39, shown in detail in FIGS. 12 and 13, which extends rearwardly into the valve housing 12 to rotatably direct the valve 20 as will be described below.

Figure 8:
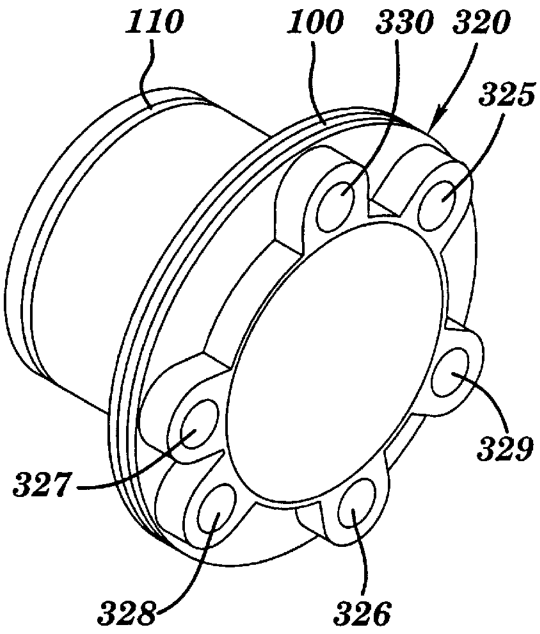
FIG. 8 shows an isometric view of the valve in accordance with a fourth embodiment of the present invention.

In operation, first ports 35, 37 of chambers 19A, 19B, either alone or in combination, drive the rotor in a first direction (e.g., a forward clockwise direction as shown in FIG. 8) when pressurized air is directed therethrough from inner housing openings 31 and/or 33, respectively. Similarly, second ports 36, 38 drive the rotor in a second direction, either alone or in combination, (e.g., a reverse counterclockwise direction as shown in FIG. 8) when pressurized air is directed therethrough from inner housing openings 32 and/or 34, respectively. When two ports are receiving pressurized air, the tool will be in an overdrive state.

Figure 5:
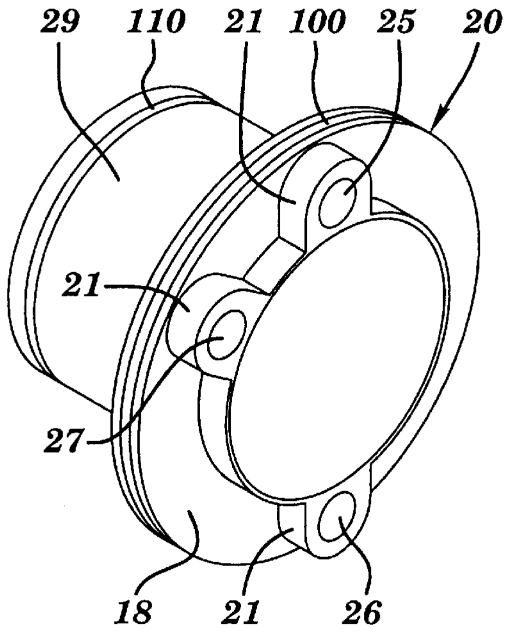
FIG. 5 shows an isometric view of the valve in accordance with the first embodiment of the present invention.
Figure 6:
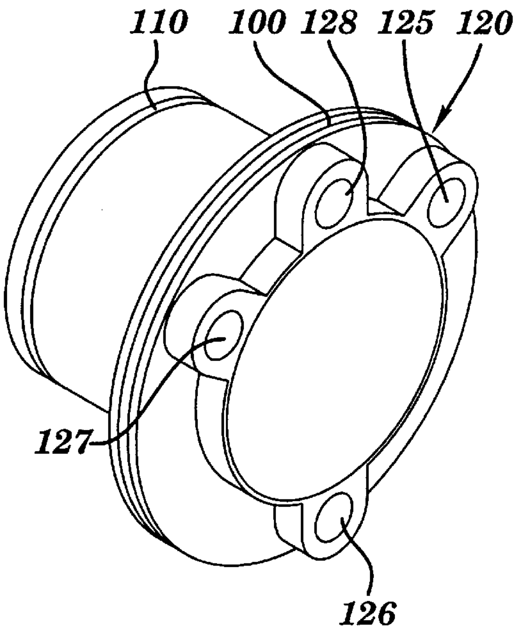
FIG. 6 shows an isometric view of the valve in accordance with a second embodiment of the present invention.
Figure 7:
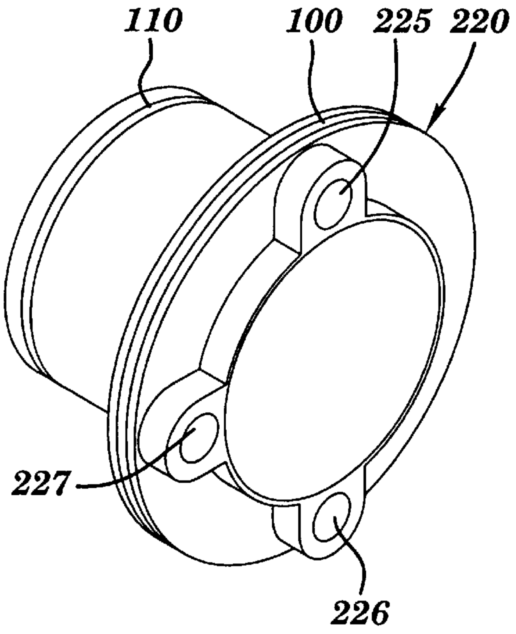
FIG. 7 shows an isometric view of the valve in accordance with a third embodiment of the present invention.

In accordance with the present invention, as shown in FIGS. 1–7, a reverse and overdrive selection valve 20 is provided to determine which inner housing openings 31–34 and, hence, which pressure chamber ports 35–38 receive pressurized air from valve housing 12. As shown in FIGS. 5–7, the valve for a two chambered motor can take a variety of forms without departing from the scope of the present invention.

In general, the valve 20 includes a rotatable planar element 18 including apertured raised areas 21 and a handle extension 29. As shown in FIGS. 2–4, the valve 20 rotatably sits in a valve housing manifold 70 of the valve housing 12. A seal 100 seals the planar element 18 inside the valve housing manifold 70 and a seal 110 seals the handle extension 29 inside a handle bore 74 on the rear of the valve housing 12. With the valve housing a manifold 70 sealed by the seals 100, 110, the valve housing can receive pressurized air via opening 14 to be directed to the rotor 50 via the inner housing 30 and valve 20. So that an operator can adjust the valve, the handle extension 29, on a face external of the valve housing, includes the before mentioned handle 22 for turning of the valve.

To direct pressurized air from the valve housing manifold 70, the valve 20 is rotatably supported around the circular lip 39 of the inner housing 30. Each apertured raised area 21 on the valve 20 includes one aperture 25–27 that extends through the planar element 18 and raised area 21. By rotation of the valve 20, the apertures 25–27 are alignable with inner housing openings 31–34 to selectively deliver pressurized air through inner housing openings 31–34 to selective ports 35–38. To accommodate driving the motor with pressurized air through only one port, at least one aperture 27 is positioned such that the valve may be located to align that aperture with one of the ports 35–38. Furthermore, to accommodate the overdrive feature through delivery of pressurized air through two ports, at least two apertures 25, 26 are provided on opposite sides and equidistant from the axis of the valve. For instance, as shown in FIG. 3, in the reverse overdrive position, valve apertures 25, 26 are aligned with inner housing apertures 32, 34, respectively, to deliver pressurized air to second ports 36, 38.

As illustrated by FIGS. 5–7, positioning of the raised aperture areas 21 and, hence, apertures 25–27; 125–127; and 225–227 can be varied. Varying the positioning of the apertures allows changing the position of the handle 22 of the valve. For instance, as shown in FIG. 1, the valve 20 of FIG. 5 allows for a certain location of the valve by laying the raised aperture areas 21 in a general y-shape. In FIG. 6, the valve 120 includes four apertures 125–128 laid out in a general Y-shape with the fourth aperture laid out equidistant between upper branches of the Y-shape (i.e., ø or peace sign lay out). In FIG. 7, the valve 220 includes three apertures 225–227 laid out in a general T-shape.

The number of apertures in the valve and, therefore, the number of positions the valve is capable of achieving are determined by the number of chambers in the motor. In the two chamber motor illustrated, the valve 20, shown in FIG. 5, is capable of positioning in at least four positions, for example: a first position in which valve aperture 27 is in pneumatic communication with inner housing opening 31 to drive the motor in the forward direction via first port 35; a second position in which valve aperture 27 is in pneumatic communication with inner housing opening 34 to drive the motor in a reverse direction via second port 38; a third position in which valve apertures 25 and 26 are in pneumatic communication with inner housing apertures 32, 34 to drive the motor in a reverse overdrive direction via second ports 36, 38; and a fourth position in which valve apertures 25 and 26 are in pneumatic communication with inner housing apertures 31, 33 to drive the motor in a forward overdrive direction via first ports 35, 37.

FIGS. 8 and 10 illustrate that the motor in accordance with the present invention may include more than two chambers—each chamber including a first and second port. As is clear from FIG. 10, all of the first ports and all of the second ports are equidistant around the rotor chamber (all first ports are separated by 120 degrees and all second ports are separated by 120 degrees).

As shown in FIG. 8, the rotary valve for use with a three chambered motor includes three sets of apertures: (1) 327; (2) 325, 326; and (3) 328–330. The set of apertures 328–330 are positioned equidistant (separated by 120 degrees) so that all chambers, for either a forward or reverse direction, can receive pressurized air when the valve is positioned in the proper location (full overdrive). Additionally, the apertures 325, 326 are positioned 120 degrees from each other around the valve so that two chambers, for either a forward or reverse direction, can receive pressurized air (intermediate overdrive). The third aperture 327 is positioned so that one chamber can receive pressurized air.

Each set of apertures 327; 325, 326; and 328–330 are positioned so as not to interfere with operation of another set of apertures. In other words, while the apertures of a given set are selected to provide pressurized air to one, two or three of the ports, the apertures not within the given set are positioned so that they do not provide pressurized air to any of the other ports.

Accordingly, in this alternate embodiment, the valve is capable of being positioned in at least six positions: a first position allowing flow to the first port of any one of the pressure chambers; a second position allowing flow to the second port of any one of the pressure chambers; a third position allowing flow to the first port of any two of the pressure chambers; a fourth position allowing flow to the second port of any two of the pressure chambers; a fifth position allowing flow to the first port of all of the pressure chambers; and a sixth position allowing flow to the second port of all of the pressure chambers.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims. For instance, the device should not be limited to use with just air since other gases are contemplated to be applicable.

What is claimed is:

1. A pneumatic tool comprising:

a housing;

a rotor rotatably mounted within the housing;

an output shaft, operatively coupled to the rotor;

at least two pressure chambers, defined between the housing and the rotor, wherein each pressure chamber includes at least two ports; and a pneumatic reverse valve, operatively coupled to control the rotor, wherein the pneumatic reverse valve provides a first torque and a first speed to the output shaft by directing pressurized air through at least one of the ports, and an increased torque and increased speed to the output shaft by directing pressurized air through at least two opposing ports within the pressure chambers.

2. The pneumatic tool of claim 1, further comprising:

an input port operatively coupled to the pneumatic reverse valve; and an exhaust port for exhausting air from the pressure chambers.

3. The pneumatic tool of claim 1, wherein the pneumatic reverse valve is a rotary reverse valve, the rotary reverse valve being rotatable about an axis.

4. The pneumatic tool of claim 3, wherein the rotary reverse valve is a planar element and includes at least three apertures therethrough.

5. The pneumatic tool of claim 4, wherein two of the at least three apertures are on opposite sides and equidistant from the axis.

6. The pneumatic tool of claim 5, wherein the apertures are laid out in a general T-shape.

7. The pneumatic tool of claim 5, wherein the apertures are laid out in a general y-shape.

8. The pneumatic tool of claim 5, wherein the apertures include four apertures, three of the apertures being laid out in a general Y-shape with the fourth aperture laid out equidistant between upper branches of the Y-shape.

9. The pneumatic tool of claim 3, wherein the rotary reverse valve further comprises a handle, the handle being rotatably positionable relative to an exterior of the housing.

10. The pneumatic tool of claim 1, wherein the tool consists of three pressure chambers.

11. A reverse valve for a pneumatic tool having:

a housing;

a rotor rotatable mounted within the housing; and at least two pressure chambers, defined between the housing and the rotor, each having at least two ports therein, wherein the pneumatic reverse valve controls pressurized air flow through a first port to rotate the rotor at a first speed and a first torque, and through the first port and a second opposing port to rotate the rotor at an increased speed and an increased torque.

12. The pneumatic tool of claim 11, wherein the reverse valve is a planar element and includes at least three apertures therethrough.

13. The pneumatic tool of claim 12, wherein the apertures are laid out in a general T-shape.

14. The pneumatic tool of claim 12, wherein the apertures are laid out in a general y-shape.

15. The pneumatic tool of claim 12, wherein the apertures include four apertures, three of the apertures being laid out in a general Y-shape with the fourth aperture laid out equidistant between upper branches of the Y-shape.

16. A pneumatic tool including a housing and a rotor and having at least two pressure chambers defined by the housing and the rotor, each pressure chamber including a first port to receive pressurized air to drive the rotor in a first direction at a first speed and a first torque, and a second port to receive pressurized air to drive the rotor in a second direction at a second increased speed and increased torque when combined with the first port of the opposing pressure chamber, the pneumatic tool comprising:

a valve for selectively controlling flow of pressurized air into the first and second port of each pressure chamber.

17. The pneumatic tool of claim 16, wherein when the valve is selected to control flow of pressurized air to the first port of either chamber, flow to the second port within that chamber is prevented; and wherein when the reverse valve is selected to control flow of pressurized air to the second port of either chamber, flow to the first port within that chamber is prevented.

18. The pneumatic tool of claim 16, wherein the tool includes a first and second pressure chamber and the reverse valve is positionable in one of:

a first position allowing flow to the first port of the first or second pressure chamber;

a second position allowing flow to the second port of the first or second pressure chamber;

a third position allowing flow to the first port of the first and second pressure chamber; and a fourth position allowing flow to the second port of the first and second pressure chamber.

19. The pneumatic tool of claim 16, wherein the pneumatic tool includes a first, second and third pressure chamber and the reverse valve is positionable in one of:

a first position allowing flow to the first port of any one of the pressure chambers;

a second position allowing flow to the second port of any one of the pressure chambers;

a third position allowing flow to the first port of any two of the pressure chambers;

a fourth position allowing flow to the second port of any two of the pressure chambers;

a fifth position allowing flow to the first port of all of the pressure chambers; and a sixth position allowing flow to the second port of all of the pressure chambers.

* * * * *